L. RODENHAUSEN.
Carriage-Spring Coupling.
No. 98,418.
Patented Dec. 28, 1869.
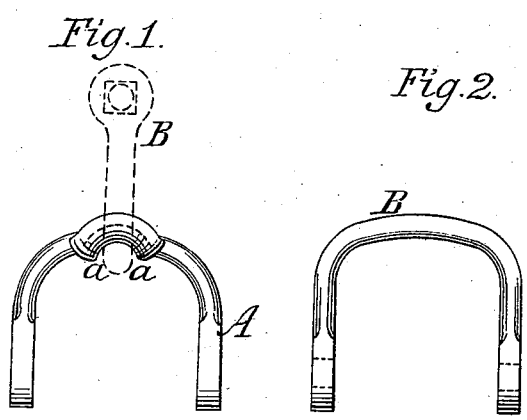

United States Patent Office.

L. RODENHAUSEN, OF PHILADELPHIA, PENNSYLVANIA.

Letters Patent No. 98,418, dated December 28, 1869.

IMPROVEMENT IN SPRING COUPLING

The Schedule referred to in these Letters Patent and making part of the same.

*To all whom it may concern:*

Be it known that I, L. RODENHAUSEN, of the city and county of Philadelphia, and State of Pennsylvania, have invented certain new and useful Improvements in Spring-Couplings for Carriages, &c.; and I do hereby declare the following to be a full, clear, and exact description thereof, sufficient to enable others skilled in the art to which my invention appertains to make and use the same, reference being had to the accompanying drawings, making part of this specification, in which—

Figures 1 and 2 are elevations of two sections, comprising a coupling, as illustrating my invention.

Figures 3 and 4 are elevations of a coupling made in one piece, and likewise illustrating my invention.

Similar letters of reference indicate corresponding parts in the several figurns.

It is at present customary to construct the coupling to which the ends of springs are secured, of wrought-iron. This is quite an expensive item in the manufacture of carriages and wagons, partly owing to the difficulty of producing the couplings, in consequence of their curved forms, as well as the expense of metal.

Cast-metal couplings will not answer the same purpose, owing to their liability of breakage and fracture, in view of the shocks and jars to which carriages and wagons, especially, are subjected.

I have endeavored to obviate these difficulties by making the couplings of peculiar construction, and specially forming them of malleable iron.

In figs. 1 and 2, I show a sectional coupling, in which the part A is made separate from the part B.

I form a groove or depression, $a$, in the under side of the arch of the part A, and this groove receives the the arch $b$ of the part B.

By thus making the coupling in two parts, the springs are allowed more play, and, therefore, have more perfect and less limited bearings.

All shocks are in part checked, owing to the "give" between the sections, and there is thereby but little opportunity for breaking or fracture thereof.

In order to render the sectional coupling still more complete, I form it of malleable iron, whereby I save at least two-thirds of the cost of the couplings now in common use. The strength of malleable iron is too well known to require further reference.

I produce a superior article of manufacture, combining utility, strength, and cheapness.

Having thus described my invention,

What I claim as new, and desire to secure by Letters Patent, is—

The two-part coupling A B, the part A being provided with groove A, substantially as and for the purpose described.

The above signed by me, this    day of    , 1869.

L. RODENHAUSEN.

Witnesses:
   W. A. WIEDERSHEIM,
   CHALKLEY KEMBLE.